(12) United States Patent
Ohta et al.

(10) Patent No.: US 8,292,176 B2
(45) Date of Patent: Oct. 23, 2012

(54) CARD PROCESSING DEVICE

(75) Inventors: Keiji Ohta, Nagano (JP); David Charles Carrington May, Scotland (GB)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 12/671,582

(22) PCT Filed: Jul. 28, 2008

(86) PCT No.: PCT/JP2008/002010
§ 371 (c)(1),
(2), (4) Date: Jul. 19, 2011

(87) PCT Pub. No.: WO2009/016819
PCT Pub. Date: Feb. 5, 2009

(65) Prior Publication Data
US 2011/0266346 A1    Nov. 3, 2011

(30) Foreign Application Priority Data

Jul. 31, 2007    (JP) .................................. 2007-199434

(51) Int. Cl.
| | |
|---|---|
| G06K 7/08 | (2006.01) |
| G06K 5/00 | (2006.01) |
| G06K 7/00 | (2006.01) |
| G06Q 40/00 | (2012.01) |
| G07F 19/00 | (2006.01) |
| G06F 7/00 | (2006.01) |

(52) U.S. Cl. ........ 235/449; 235/435; 235/379; 235/380; 235/381

(58) Field of Classification Search .......... 235/379–381, 235/435, 449
See application file for complete search history.

(56) References Cited

U.S. PATENT DOCUMENTS

| | | | | |
|---|---|---|---|---|
| 3,737,884 | A * | 6/1973 | Wallace ............................ 360/2 |
| 4,181,920 | A * | 1/1980 | Cerekas .......................... 360/88 |
| 4,812,632 | A * | 3/1989 | Kakinuma et al. ............ 235/479 |
| 5,223,774 | A * | 6/1993 | Ikeda et al. ................... 318/268 |
| 5,594,233 | A * | 1/1997 | Kenneth et al. ............... 235/492 |
| 5,646,392 | A * | 7/1997 | Oguchi .......................... 235/475 |
| 5,773,805 | A * | 6/1998 | Nakamura et al. ............ 235/441 |
| 5,796,083 | A * | 8/1998 | Kenneth et al. ............... 235/380 |

(Continued)

FOREIGN PATENT DOCUMENTS

JP          1-166285 A    6/1989

(Continued)

OTHER PUBLICATIONS

International Search Report for International Application No. PCT/JP2008/002010 mailed Oct. 7, 2008 with English Translation Primary Examiner — Daniel Walsh
(74) Attorney, Agent, or Firm — Cantor Colburn LLP

(57) ABSTRACT

A card processing device for use with a card may include a first card processing section and a second card processing section. The first card processing section may include a card insertion slot at one end of the card processing section for inserting the card, and a magnetic head for reading magnetic information recorded in the card. The second card processing section may include a card transfer mechanism for transferring the card, and a recorder for recording information into the card. The second card processing section is connected to the other end of the first card processing station.

17 Claims, 5 Drawing Sheets

U.S. PATENT DOCUMENTS

| | | | |
|---|---|---|---|
| 5,929,426 A * | 7/1999 | May | 235/475 |
| 6,182,896 B1 * | 2/2001 | Momose | 235/449 |
| 6,629,643 B1 * | 10/2003 | Nagata et al. | 235/475 |
| 7,347,377 B2 * | 3/2008 | Kitazawa | 235/475 |
| 7,377,434 B2 * | 5/2008 | Wakabayashi | 235/449 |
| 2002/0088862 A1 * | 7/2002 | Imai et al. | 235/475 |
| 2004/0026507 A1 * | 2/2004 | Nagata et al. | 235/449 |
| 2004/0094628 A1 * | 5/2004 | Yoshii | 235/475 |
| 2005/0116036 A1 * | 6/2005 | Akahane et al. | 235/449 |
| 2005/0218227 A1 * | 10/2005 | Takita et al. | 235/441 |
| 2006/0138241 A1 * | 6/2006 | Kitazawa | 235/475 |
| 2007/0080231 A1 * | 4/2007 | Tadamasa | 235/475 |
| 2007/0131768 A1 * | 6/2007 | Wakabayashi | 235/449 |
| 2007/0158432 A1 * | 7/2007 | Tadamasa | 235/480 |
| 2012/0002313 A1 * | 1/2012 | Miyabe et al. | 360/2 |

FOREIGN PATENT DOCUMENTS

| | | |
|---|---|---|
| JP | 7-29298 A | 1/1995 |
| JP | 7-334629 A | 12/1995 |

* cited by examiner

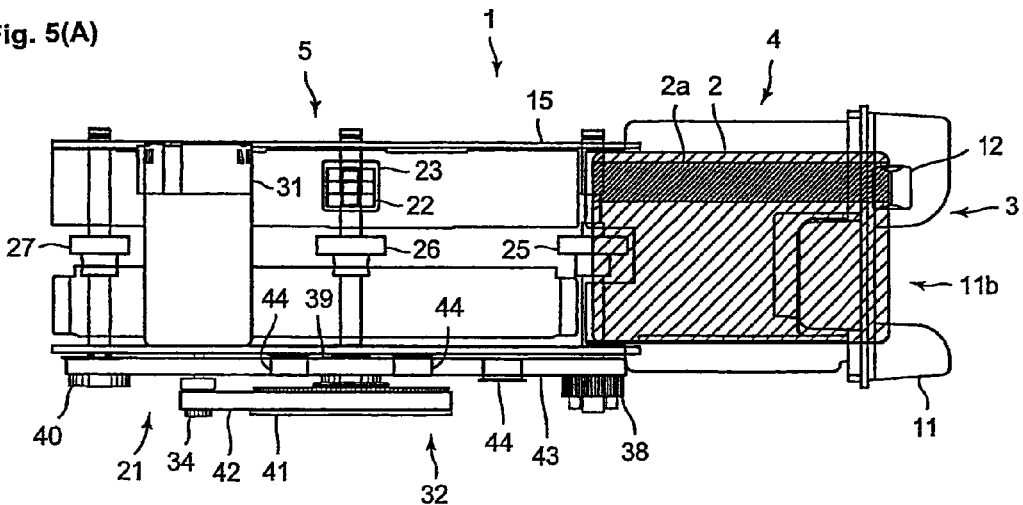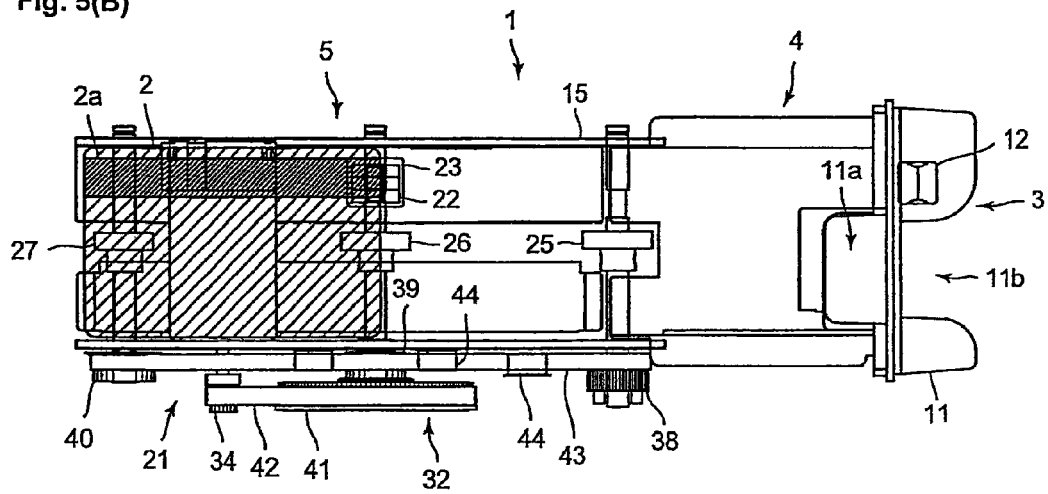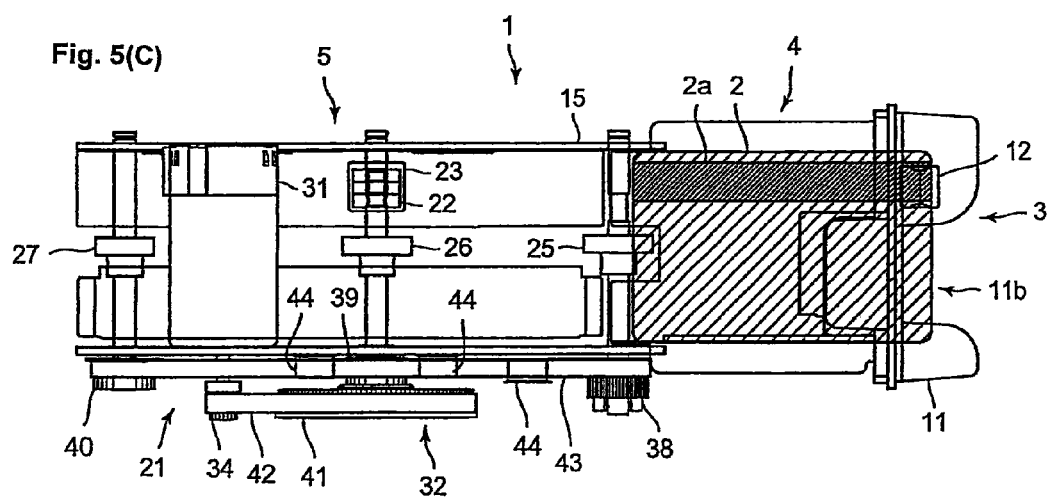

US 8,292,176 B2

CARD PROCESSING DEVICE

CROSS REFERENCE TO RELATED APPLICATIONS

This is a U.S. national stage of application No. PCT/JP2008/002010, filed on Jul. 28, 2008. Priority under 35 U.S.C. §119(a) and 35 U.S.C. §365(b) is claimed from Japanese Application No. 2007-199434, filed Jul. 31, 2007, the disclosure of which is also incorporated herein by reference.

FIELD OF THE INVENTION

The present invention relates to a card processing device for carrying out a prescribed processing operation on a card.

BACKGROUND

Conventionally well known is a card reader that reads magnetic information recorded in a card and also records magnetic information into a card (For example, refer to Patent Document 1 and Patent Document 2). A card reader of Patent Document 1 and Patent Document 2 includes a card insertion slot for inserting a card, a card transfer path for transferring the inserted card, and a magnetic head for reading magnetic information of the card that is placed in the card transfer path so as to be transferred, and for recording magnetic information into the card being transferred.

A card reader described in Patent Document 1 includes a magnetic head, and the card reader reads and records magnetic information by using the one and only magnetic head. Meanwhile, a card reader described in Patent Document 2 includes two reading magnetic heads for reading magnetic information and two recording magnetic heads for recording magnetic information.

Patent Document 1: Japanese Unexamined Patent Application Publication No. H07-334629

Patent Document 2: Japanese Unexamined Patent Application Publication No. H07-29298

Usually, most of higher-level devices, in which a card reader is installed, carry out only reading magnetic information of a card inserted. However, in the card reader of either of Patent Document 1 and Patent Document 2, a recording magnetic head is placed in a card transfer path. Therefore, even in a case where only reading operation for magnetic information is carried out, the card inevitably contacts the recording magnetic head. As a result, there rises a problem that the recording magnetic head becomes worn away despite a low frequency of recording operation for magnetic information.

Thus, there is a need for a card processing device in which abrasion and damage to a recording means can be suppressed.

SUMMARY OF THE INVENTION

To solve the problem described above, at least an embodiment of a card processing device may include: a first card processing section having a card insertion slot at one end of the first card processing section for inserting a card, and a magnetic head for reading magnetic information recorded in the card; and a second card processing section having a card transfer means for transferring the card, and a recording means for recording information into the card, wherein the second card processing section is connected to the other end of the first card processing section.

At least an embodiment of a card processing device may include: the first card processing section having the card insertion slot at one end of the first card processing section and the magnetic head; and the second card processing section connected to the other end of the first card processing section. Therefore, the magnetic information of the card inserted can be read by only the first card processing section so that it becomes unnecessary to transfer the card in the second card processing section having the recording means when only reading the magnetic information of the card is carried out. As a result, it becomes possible to suppress abrasion and damage to the recording means for recording information into the card.

In at least an embodiment, it is preferable that either of the first card processing section and the second card processing section includes a transfer roller for transferring the card while contacting the card, and a pad roller biased toward the transfer roller, at a boundary of the first card processing section and the second card processing section. According to this construction, when it is necessary to record information into the card, the card can be taken into the second card processing section appropriately by turning the transfer roller in a forward direction. On the other hand, when only reading magnetic information of the card is carried out, it becomes possible to prevent the card 2 from entering the second card processing section 5 by stopping the transfer roller or turning the transfer roller in a reverse direction.

In at least an embodiment, it is preferable that the card processing device includes a shutter, which can appear in a card transfer path for the card passing, at the boundary of the first card processing section and the second card processing section. According to this construction, when only reading magnetic information of the card is carried out, the shutter can surely prevent the card from entering the second card processing section.

In at least an embodiment, the second card processing section may include at least one of a magnetic head, an IC contact, a thermoelectric-printing head, and an antenna for communicating with another antenna mounted on the card, for example, as the recording means. Then, various kinds of information according to the type of the card can appropriately be recorded in the second card processing section.

In at least an embodiment, it is preferable that the recording means is a magnetic head, and the information recorded by the recording means includes updated information of the magnetic information to be read by the magnetic head of the first card processing section. According to this construction, the magnetic information to be read in the first card processing section can be updated easily in the second card processing section.

In at least an embodiment, it is preferable that the card includes a magnetic stripe in which magnetic information is recorded, and a distance between the transfer roller and the magnetic head of the first card processing section is longer than the length of a part where the magnetic information is recorded in the magnetic stripe. According to this construction, operation of reading the magnetic information by the magnetic head of the first card processing section can finish before an end of the card inserted from the card insertion slot arrives at the transfer roller. Accordingly, the card can be inserted smoothly into the first card processing section, so that the first card processing section can appropriately read the magnetic information.

In at least an embodiment, it is preferable that the card transfer means finishes operation of sending out the card under conditions where the card is partially exposed out of the card insertion slot, and the card has already got out of a gap between the transfer roller and the pad roller, when sending out the card from the second card processing section to the first card processing section. According to this construction, a pullout resistance, at the time when a user pulls the card out of the first card processing section, can be reduced so that the user can easily pull the card out of the first card processing section.

In at least an embodiment, the card transfer means may as well finish operation of sending out the card under conditions where the card is partially exposed out of the card insertion slot, and an end of the card in a transfer direction of the card is held between the transfer roller and the pad roller, while the end of the card being located at a side of the second card processing section, when sending out the card from the second card processing section to the first card processing section. According to this construction, the card can get stopped accurately by the transfer roller and the pad roller. Therefore, after the card gets stopped, operation can be carried out appropriately in the first card processing section.

In at least an embodiment, it is preferable that the card processing device includes a drive motor for driving the transfer roller, a detection means located in the proximity of the transfer roller for detecting an end of the card in the transfer direction of the card, and a motor control means for controlling the drive motor; and the motor control means decelerates the drive motor to eventually stop it, having spent a certain time after the detection means detects an end of the card at a side of the first card processing section in the transfer direction. According to this construction, even in a case where operation of sending out the card finishes while the card being out of the gap between the transfer roller and the pad roller, operation accuracy of stopping the card can be improved. When operation of sending out the card finishes under a condition where an end of the card in a transfer direction of the card is held between the transfer roller and the pad roller, while the end of the card being located at a side of the second card processing section; the operation accuracy of stopping the card can be further improved.

In at least an embodiment, it is preferable that the card processing device includes a judgment means into which magnetic information read by the magnetic head of the first card processing section is entered, and the judgment means makes a judgment on the necessity of recording information by the recording means according to the magnetic information entered. According to this construction, it can be judged according to the magnetic information read in the first card processing section, whether or not the card is taken into the second card processing section.

In at least an embodiment, it is preferable that the card processing device includes a transmitting means for transmitting magnetic information read by the magnetic head of the first card processing section to a higher-level device in which the card processing device is mounted. According to this construction, the higher-level device can appropriately control the card processing device according to a reading result of the magnetic information read by the magnetic head.

As described above, in a card processing device according to at least an embodiment of the present invention, abrasion and damage to a recording means for recording information into a card can be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A is a drawing that shows a condition where a card has been inserted into a first card processing section and a magnetic head has finished reading magnetic information.

FIG. 5B is a drawing that shows a condition where the card has been taken into a second card processing section.

FIG. 5C is a drawing that shows a condition where the card has been sent from the second card processing section to the first card processing section.

DETAILED DESCRIPTION OF PREFERRED EMBODIMENTS

At least an embodiment of the present invention is described below with reference to the accompanying drawings.

(Structure of Card Processing Device)

Figure 1:
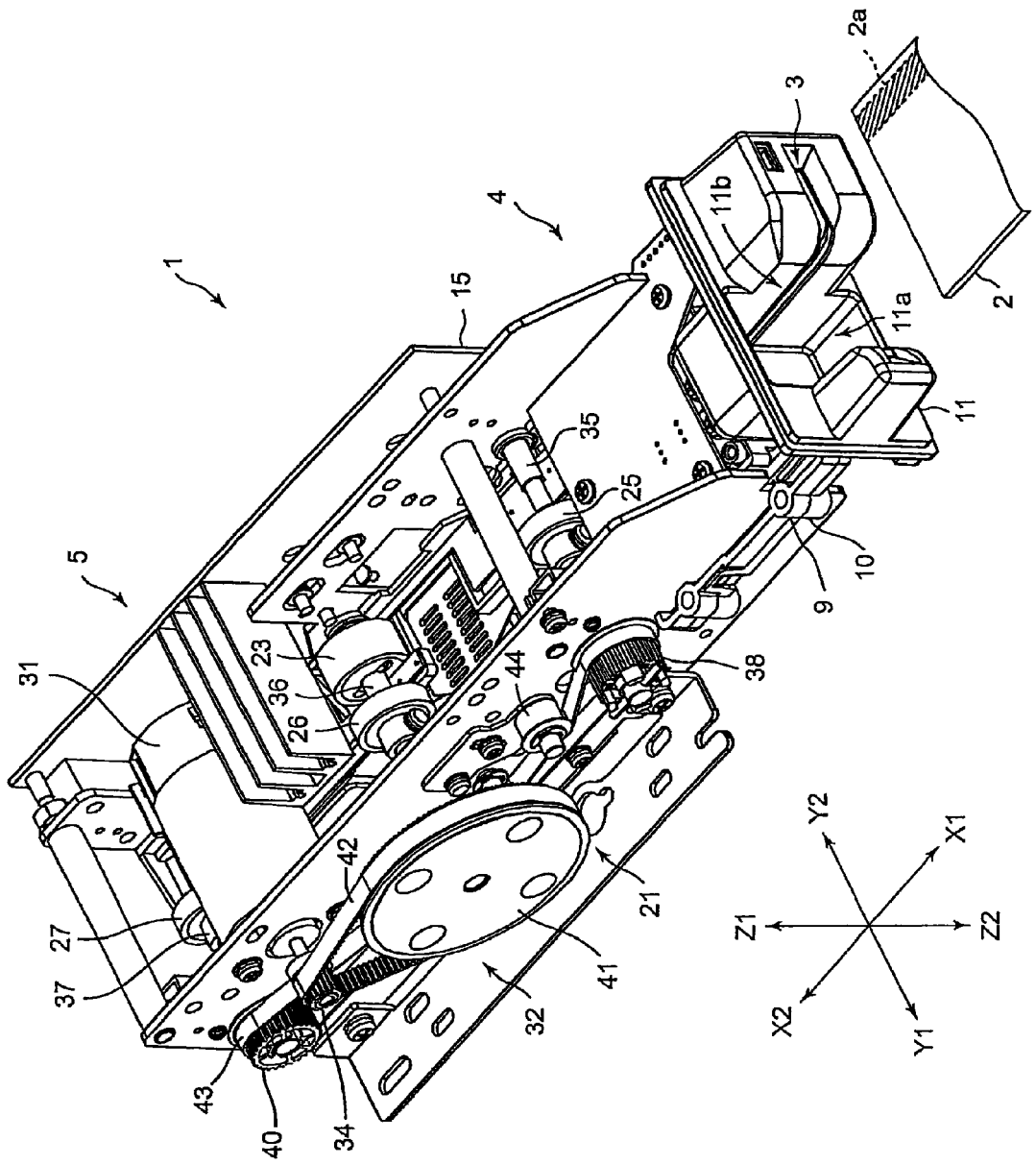
FIG. 1 is a perspective view showing a card processing device according to an embodiment of the present invention.
Figure 2:
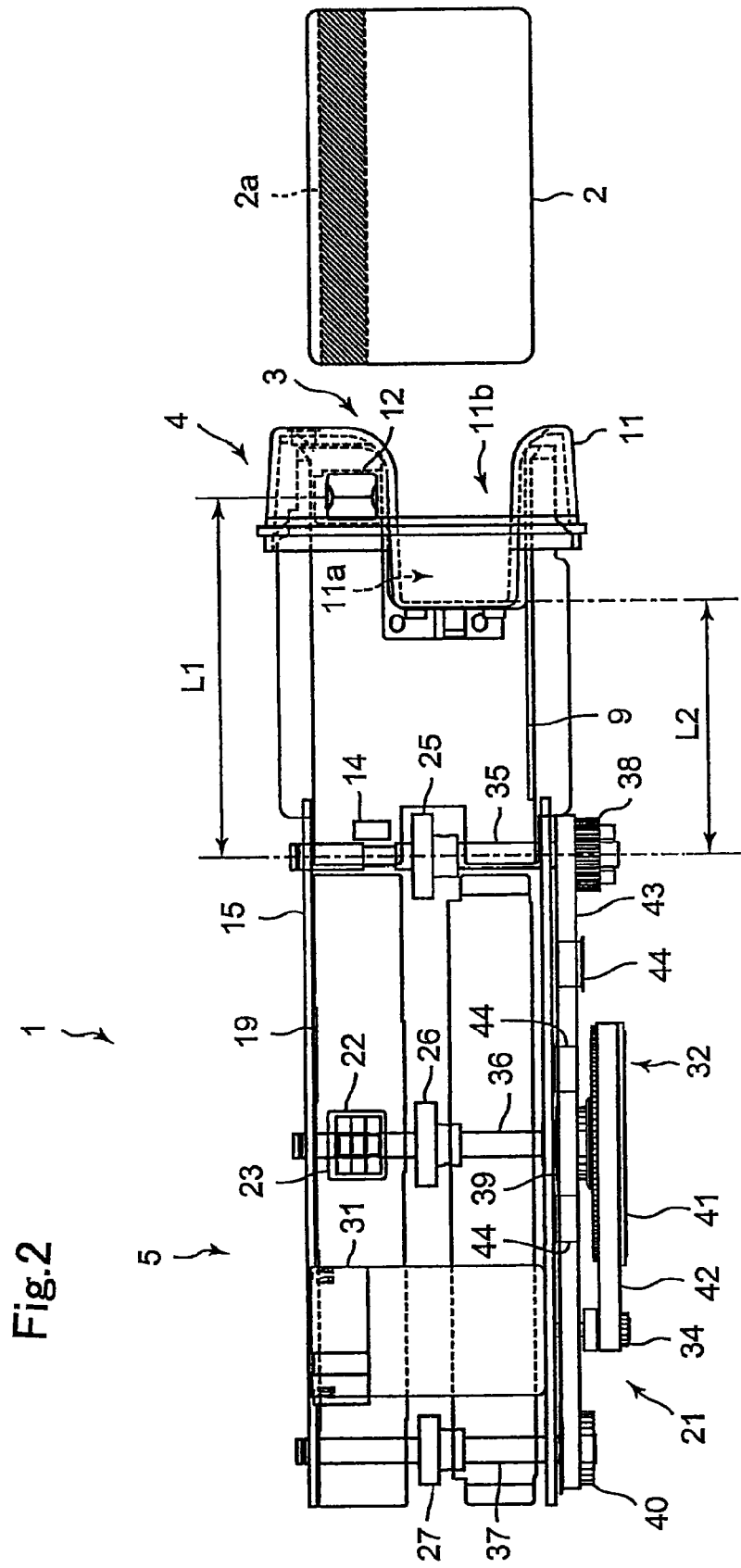
FIG. 2 is a top view of the card processing device shown in FIG. 1 for explaining an outline framework of the card processing device.
Figure 3:
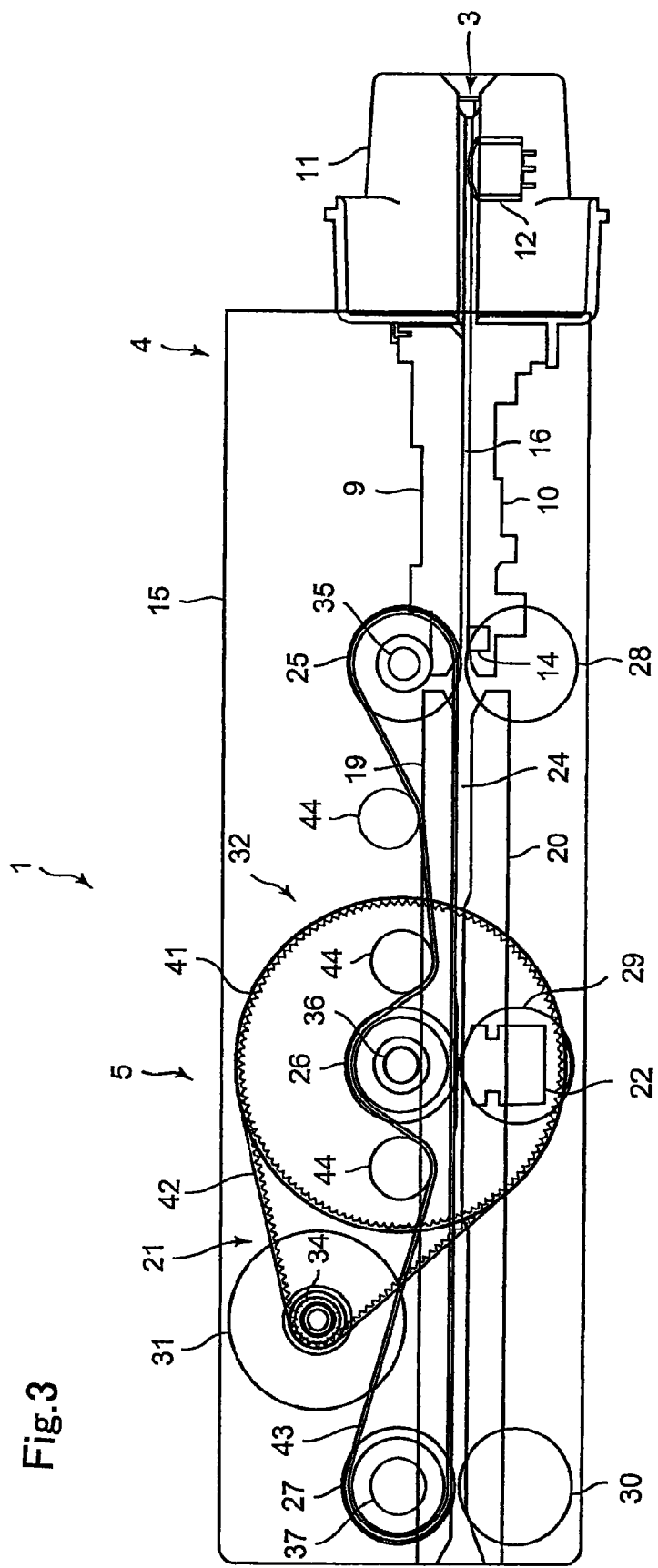
FIG. 3 is a side view of the card processing device shown in FIG. 1 for explaining an outline framework of the card processing device.
Figure 4:
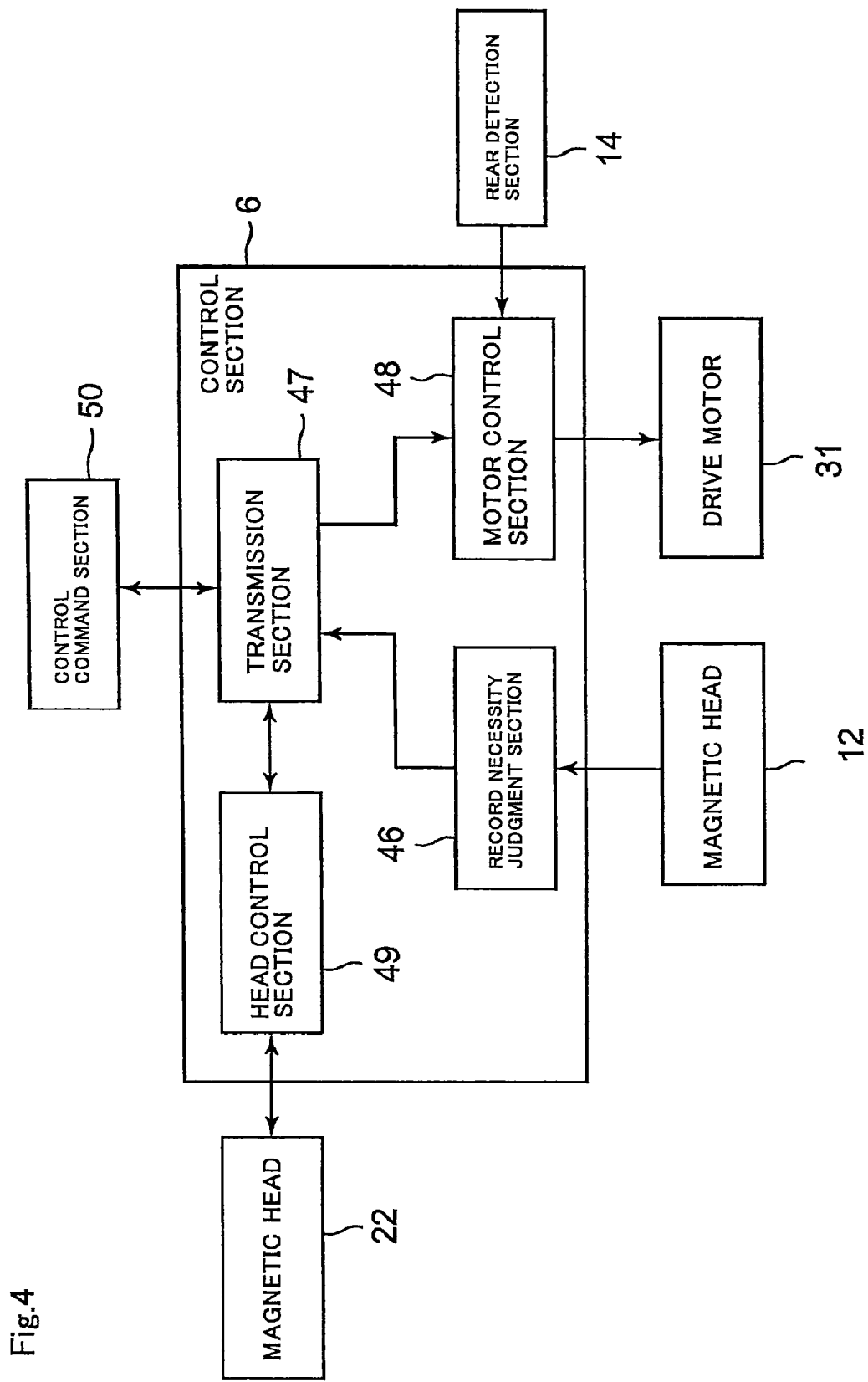
FIG. 4 is a block diagram showing an outline framework of a control section and its peripheral units of the card processing device shown in FIG. 1.

FIG. 1 is a perspective view showing a card processing device 1 according to an embodiment of the present invention. FIG. 2 is a top view of the card processing device 1 shown in FIG. 1 for explaining an outline framework of the card processing device. FIG. 3 is a side view of the card processing device 1 shown in FIG. 1 for explaining an outline framework of the card processing device. FIG. 4 is a block diagram showing an outline framework of a control section 6 and its peripheral units of the card processing device 1 shown in FIG. 1.

In the following explanation; "the front" corresponds to a direction toward X1 in FIG. 1 (a direction toward the right in FIGS. 2 and 3), "the rear" corresponds to a direction toward X2 in FIG. 1 (a direction toward the left in FIGS. 2 and 3), "the left" corresponds to a direction toward Y1 in FIG. 1 (a downward direction in FIG. 2, and a direction toward the near side in FIG. 3), "the right" corresponds to a direction toward Y2 in FIG. 1 (an upward direction in FIG. 2, and a direction toward the far side in FIG. 3), "the upside" corresponds to a direction toward Z1 in FIG. 1 (a direction toward the near side in FIG. 2, and an upward direction in FIG. 3), and "the downside" corresponds to a direction toward Z2 in FIG. 1 (a direction toward the far side in FIG. 2, and a downward direction in FIG. 3). Furthermore, in the following explanation; a forward end (an end in a direction toward X1) of a card 2 is called "front end", while a backward end (an end in a direction toward X2) of the card 2 is called "rear end". Moreover, in the present embodiment, a front-back direction (a horizontal direction in FIGS. 2 and 3) corresponds to a transfer direction of the card 2.

The card processing device 1 of the present embodiment is an apparatus to be used mainly for reading magnetic information recorded in the card 2 inserted, and for recording magnetic information into the card 2 inserted, when required. The card processing device is operated, being built in a prescribed higher-level device (not shown), such as an ATM (Automated Teller Machine). As shown in FIGS. 1 to 3, the card processing device 1 includes a first card processing section 4 and a second card processing section 5; the first card processing section 4 having a card insertion slot 3, into which the card 2 is inserted, at one end (the front end) of the first card processing section; the second card processing section 5 being connected to the other end (the rear end) of the first card processing section 4. Furthermore, as shown in FIG. 4, the card processing device 1 includes the control section 6 that carries out various control operations for the card processing device 1.

According to the present embodiment, magnetic information of the card 2 inserted through the card insertion slot 3 is manually read in the first card processing section 4. Furthermore, when required, magnetic information is automatically recorded into the inserted card 2 in the second card processing section 5. Incidentally, in the present embodiment, the card 2 is inserted into the card insertion slot 3, while facing a magnetic stripe 2a formed on the card 2 toward the downside; the magnetic stripe 2a being described later.

The card 2 is, for example, a rectangular PVC card with a thickness of about 0.7 to 0.8 mm. As shown in FIG. 2, the magnetic stripe 2a, in which magnetic information is recorded, is formed on a surface of the card 2, while stretching throughout the length of the card from end to end in a front-back direction. In the present embodiment, the magnetic stripe 2a is formed at a bottom side of the card 2 (a backside of the card 2 in FIGS. 1 and 2). A recording range of the magnetic information recorded in the magnetic stripe 2a varies, depending on specifications of the card 2. For example, according to a certain specification for the card, the card 2 may include the magnetic information throughout the length of the magnetic stripe 2a from end to end in a longitudinal direction (a front-back direction); while according to another specification, the card 2 may include the magnetic information only in a part of the magnetic stripe 2a in the longitudinal direction. Incidentally, the card 2 may as well be any one of a PET (Polyethylene terephthalate) card with a thickness of about 0.18 to 0.36 mm, a paper card with a predefined thickness, and the like.

As shown in FIG. 3, the first card processing section 4 includes three guiding members that are; an upper guide 9 placed at the upside, a lower guide 10 placed at the downside, and a gateway guide 11 at a side of the front where the card insertion slot 3 is formed. Moreover, the first card processing section 4 further includes a magnetic head 12 for reading magnetic information recorded in the magnetic stripe 2a, and a front detection section (not shown) as well as a rear detection section 14 for detecting an end part of the card 2. The upper guide 9, the lower guide 10, and the gateway guide 11 are fixed to a frame 15 of the card processing device 1.

The upper guide 9 and the lower guide 10 are block parts made of a resin material. A card transfer path 16 for transferring the card 2 is formed between the upper guide 9 and the lower guide 10. Specifically, the card transfer path 16 is formed so as to be linear in the front-back direction between the upper guide 9 and the lower guide 10. A lower edge of a rear end of the upper guide 9 and an upper edge of a rear end of the lower guide 10 are chamfered, as FIG. 3 shows. Furthermore, formed at a part of front end sides of the upper guide 9 and the lower guide 10 is a recessed part where a finger insertion part 11a formed in the gateway guide 11 is placed, the finger insertion part 11a being described later. Incidentally, the upper guide 9 and the lower guide 10 may be metallic members formed through any of sheet-metal processing and die-casting.

The gateway guide 11 is a block part made of a resin material. The card insertion slot 3 is formed in the gateway guide 11 as described above, for inserting and taking out the card 2 into/from the card processing device 1, respectively. Specifically, the card insertion slot 3 is formed so as to penetrate through the gateway guide 11 in the front-back direction and to connect with the card transfer path 16. Incidentally, the gateway guide 11 may be a metallic member formed through any of sheet-metal processing and die-casting.

Formed in the gateway guide 11 are the finger insertion part 11a where a user's finger can be inserted when the user inserts and takes out the card 2 into/from the card processing device 1, respectively; and a cut part 11b where the user's finger is positioned at the time of inserting and taking out the card 2. The finger insertion part 11a and the cut part 11b are formed within a prescribed range in a width-wise direction of the gateway guide 11. Furthermore, the finger insertion part 11a and the cut part 11b are placed side by side in this order in a direction from the rear end side of the gateway guide 11.

The finger insertion part 11a is so formed as to be a bore recessed from a rear end of the cut part 11b in a direction toward the rear. The finger insertion part 11a is positioned at the recessed part that is formed at the front end sides of the upper guide 9 and the lower guide 10, so as to connect with the card transfer path 16. Furthermore, the finger insertion part 11a is formed, having a height (a height in a vertical direction) and a width (a width in a horizontal direction) that enable the user's finger to be inserted. The cut part 11b is formed from a front end of the gateway guide 11 toward the finger insertion part 11a by cutting out all the part in the vertical direction.

The magnetic head 12 is placed inside the gateway guide 11. Specifically, the magnetic head 12 is placed in the front end side of the gateway guide 11 so as to protrude into the card insertion slot 3 from the downside. The magnetic head 12 is biased in an upward direction by a biasing member such as a plate spring, not shown.

The front detection section (not shown) includes a detection lever that turns by contacting the card 2, and an optical sensor for detecting a turn of the detection lever. The front detection section is located at a front end side of the first card processing section 4. Specifically, the front detection section is located in the proximity of the magnetic head 12 in the front-back direction.

In the same manner as the front detection section does, the rear detection section 14 includes a detection lever (not shown) that turns by contacting the card 2, and an optical sensor (not shown) for detecting a turn of the detection lever. The rear detection section 14 is located at a rear end side of the first card processing section 4. Specifically, the rear detection section 14 is located in the proximity of a first transfer roller 25 and a first pad roller 28 in the front-back direction; the first transfer roller 25 and the first pad roller 28 being included in the second card processing section 5, and described later. In the present embodiment, the rear detection section 14 works as a detection means, located in the proximity of the first transfer roller 25, for detecting an end part of the card 2.

The second card processing section 5 includes an upper guide 19 placed at the upside and a lower guide 20 placed at the downside. Furthermore, the second card processing section 5 includes a card transfer mechanism 21 as a card transfer means for transferring the card 2, a magnetic head 22 as a recording means or recorder for recording information into the card 2 taken in the second card processing section 5, and a pad roller 23 for the magnetic head; the pad roller 23 being biased toward the magnetic head 22. The upper guide 19 and the lower guide 20 are fixed to the frame 15.

The upper guide 19 and the lower guide 20 are block parts made of a resin material. A card transfer path 24 for transferring the card 2 is formed between the upper guide 19 and the lower guide 20. Specifically, the card transfer path 24 is formed so as to be linear in the front-back direction between the upper guide 19 and the lower guide 20. A lower edge of a front end of the upper guide 19 and an upper edge of a front end of the lower guide 20 are chamfered, as FIG. 3 shows.

Furthermore, the card transfer path 24 is connected to the card transfer path 16, formed in the first card processing section 4, across a prescribed clearance. Incidentally, the upper guide 19 and the lower guide 20 may be metallic members formed through any of sheet-metal processing and die-casting.

As shown in FIG. 3 and others, the card transfer mechanism 21 includes: the first transfer roller 25; a second transfer roller 26; a third transfer roller 27; the first pad roller 28; a second pad roller 29; a third pad roller 30; a drive motor 31 for driving the first transfer roller 25 to the third transfer roller 27; and a transmission mechanism 32 for transmitting a drive power of the drive motor 31 to the first transfer roller 25, the second transfer roller 26, and the third transfer roller 27.

As shown in FIG. 3 and others, the first transfer roller 25 is positioned at a front end of the second card processing section 5. In other words, the first transfer roller 25 is positioned at a boundary of the first card processing section 4 and the second card processing section 5. Meanwhile, the second transfer roller 26 is placed almost at a middle position in the front-back direction of the second card processing section 5, and the third transfer roller 27 is positioned at a rear end of the second card processing section 5. The first transfer roller 25 to the third transfer roller 27 are installed in such a way that the transfer rollers partly protrude just a little into the card transfer path 24 (or, the card transfer path <<to be corrected: the card transfer path 15>>) in a downward direction from the upside so that the transfer rollers can contact a top surface of the card 2.

Each of the first to third pad rollers 28 to 30 is biased toward each corresponding one of the first to third transfer rollers 25 to 27 by a biasing member that is not shown. Specifically, each of the first to third pad rollers 28 to 30 is biased toward each corresponding one of the first to third transfer rollers 25 to 27 from the downside of the card transfer path 24 (or, the card transfer path <<to be corrected: the card transfer path 15>>) so that these pad rollers can contact a bottom surface of the card 2. In other words, each of the first to third pad rollers 28 to 30 is so positioned as to contact each corresponding one of the first to third transfer rollers 25 to 27 in an upward direction from the downside.

Incidentally, in the present embodiment, the first transfer roller 25 is a transfer roller positioned at the boundary of the first card processing section 4 and the second card processing section 5, the first transfer roller 25 transferring the card 2 while contacting the card. Meanwhile, the first pad roller 28 is a pad roller biased toward the first transfer roller 25 as a transfer roller.

As shown in FIG. 2, the transmission mechanism 32 includes: a driving pulley 34 fixed to an output shaft of the drive motor 31; small driven pulleys 38 to 40 fixed to each shaft end of turning shafts 35 to 37 for the first to third transfer rollers 25 to 27; a large driven pulley 41 fixed to a shaft end of the turning shaft 36 for the second transfer roller 26; a timing belt 42 placed between the driving pulley 34 and the large driven pulley 41; a timing belt 43 placed through the small driven pulleys 38 to 40; and a plurality of tension pulleys 44 for regulating a tension of the timing belt 43.

The magnetic head 22 is so placed as to protrude into the card transfer path 24 in an upward direction from the lower guide 20. The magnetic head 22 is placed almost at a middle position in the front-back direction of the second card processing section 5. The magnetic head 22 in the present embodiment also has a function of reading magnetic information recorded in the card 2, in addition to a function of recording magnetic information into the card 2.

The pad roller 23 for the magnetic head is biased toward the magnetic head 22 by a biasing member that is not shown. Specifically, the pad roller 23 for the magnetic head is so biased as to contact the magnetic head 22 in a downward direction from the upside.

As shown in FIG. 2, in the present embodiment; a distance L1, existing between a turning center of the first transfer roller 25 (which is namely a position where the first transfer roller 25 and the first pad roller 28 contact each other) and a gap position of the magnetic head 12 in the front-back direction, is a little longer than the length of the card 2 in its longitudinal direction (the transfer direction). Meanwhile, a distance L2, existing between the position where the first transfer roller 25 and the first pad roller 28 contact each other and a rear end position of the finger insertion part 11a in the front-back direction, is shorter than the length of the card 2 in its longitudinal direction. Meanwhile, a distance between the turning center of the first transfer roller 25 and a turning center of the second transfer rollers 26, as well as a distance between the turning center of the second transfer rollers 26 and a turning center of the third transfer rollers 27 are somewhat shorter than the length of the card 2 in its longitudinal direction.

As shown in FIG. 4, for a configuration relating to the magnetic heads 12 & 22, and the drive motor 31 in the present embodiment; the control section 6 includes: a record necessity judgment section 46, a transmission section 47, a motor control section 48, and a head control section 49. Meanwhile, the control section 6 is connected to a control command section 50 of a higher-level device in which the card processing device 1 is mounted. Incidentally, in reality, the record necessity judgment section 46 is materialized with a calculation means such as a CPU or a storage means such as a RAM, while the transmission section 47 is materialized with an I/O means such as an I/O port. The motor control section 48 and the head control section 49 are materialized in reality with a drive circuit including a transistor and others, and a calculation means such as a CPU, respectively.

The record necessity judgment section 46 receives magnetic information read by the magnetic head 12. Then, according to the magnetic information entered, the record necessity judgment section 46 makes a judgment on whether or not it is needed to record the magnetic information into the card 2 by using the magnetic head 22. In other words, the record necessity judgment section 46 in the present embodiment is a judgment means for judging the necessity of recording the magnetic information into the card 2 by using the magnetic head 22, according to the magnetic information entered by the magnetic head 12.

The transmission section 47 is a means for exchanging signals between the control section 6 and the control command section 50. In the present embodiment, the transmission section 47 transmits (outputs) the magnetic information read by the magnetic head 12 to the control command section 50. In other words, the transmission section 47 in the present embodiment is a transmitting means for transmitting the magnetic information read by the magnetic head 12 to the higher-level device in which the card processing device 1 is mounted. Furthermore, the transmission section 47 outputs a judgment result produced by the record necessity judgment section 46 to the control command section 50.

Furthermore, the transmission section 47 outputs a drive command for the drive motor 31 entered from the control command section 50 to the motor control section 48. Still further, the transmission section 47 outputs an energization command for the magnetic head 22, which is entered from the control command section 50, to the head control section 49; and also outputs confirmation read information by the magnetic head 22, which is entered via the head control section 49, to the control command section 50, as described later.

The motor control section 48 controls the drive motor 31. A drive command for the drive motor 31 is entered from the control command section 50 to the motor control section 48 via the transmission section 47. Specifically; if the record necessity judgment section 46 judges it necessary to record the magnetic information into the card 2, a drive command for the drive motor 31 is entered from the control command section 50 to the motor control section 48.

The motor control section 48 controls the drive motor 31 according to the drive command from the control command section 50. Specifically; as described later, the motor control section 48 controls the drive motor 31 so as to take the card 2 inserted into the first card processing section 4 to the second card processing section 5 by using the first to third transfer rollers 25 to 27, and to subsequently eject (send) the card 2 toward the first card processing section 4. Incidentally, in the present embodiment, the card 2 is taken into the second card processing section 5 in such a way that a magnetic information record area of the magnetic stripe 2a fully passes over the magnetic head 22.

Furthermore, a detection result by the rear detection section 14 on an end part of the card 2 is entered into the motor control section 48. When sending the card 2 to the first card processing section 4, the motor control section 48 decelerates and eventually stops the drive motor 31 according to the detection result by the rear detection section 14 on a front end of the card 2. In the present embodiment, if the rear detection section 14 detects the front end of the card 2; at a predetermined time after the detection of the front end, the motor control section 48 starts decelerating the drive motor 31 to stop the drive motor 31.

Specifically, the motor control section 48 decelerates and eventually stops the drive motor 31 in such a way that the drive motor 31 stops under a condition where a rear end of the card 2 has got out of a gap between the first transfer roller 25 and the first pad roller 28. In other words, in the present embodiment, the card transfer mechanism 21 completes operation of sending the card 2 from the second card processing section 5 to the first card processing section 4 under the condition where the card 2 has got out of the gap between the first transfer roller 25 and the first pad roller 28. More specifically, the motor control section 48 decelerates and eventually stops the drive motor 31 in such a way that the drive motor 31 stops at the moment when the rear end of the card 2 has got out of the gap between the first transfer roller 25 and the first pad roller 28. In other words, the operation of sending the card 2 from the second card processing section 5 to the first card processing section 4 finishes at the moment when the card 2 has got out of the gap between the first transfer roller 25 and the first pad roller 28.

According to an energization command from the control command section 50, the head control section 49 supplies a recording current to the magnetic head 22. Specifically, the head control section 49 supplies the recording current to the magnetic head 22 for recording magnetic information into the card 2, when the record necessity judgment section 46 judges it necessary to record the magnetic information into the card 2 and then the card 2 is taken into the second card processing section 5 by using the first to third transfer rollers 25 to 27. Furthermore, in the present embodiment, after the magnetic information is recorded into the card 2, confirmation reading is carried out by the magnetic head 22 for the purpose of confirming the recorded magnetic information. Then, for the confirmation operation, the head control section 49 outputs confirmation read information by the magnetic head 22, to the control command section 50 via the transmission section 47.

As described above; the distance L2, existing between the position where the first transfer roller 25 and the first pad roller 28 contact each other and the rear end position of the finger insertion part 11a, is shorter than the length of the card 2 in its longitudinal direction. Therefore, when the operation of sending the card 2 from the second card processing section 5 to the first card processing section 4 finishes under the condition where the rear end of the card 2 has got out of the gap between the first transfer roller 25 and the first pad roller 28, the front end side of the card 2 is exposed at the finger insertion part 11a and the cut part 11b. Namely, the front end side of the card 2 is exposed out of the card insertion slot 3. Therefore, a user can pull the card 2 out of the card processing device 1 (the first card processing section 4) by grasping the front end side of the card 2.

(Operation Overview of Card Processing Device)

FIGS. 5(A)-5(C) include drawings for explaining an outline of operation of the card processing device 1 shown in FIG. 1; wherein FIG. 5A shows a condition where the card 2 has been inserted into the first card processing section 4 and the magnetic head 12 has finished reading magnetic information, FIG. 5B shows a condition where the card 2 has been taken into the second card processing section 5, and FIG. 5C shows a condition where the card 2 has been sent from the second card processing section 5 to the first card processing section 4.

In the card processing device 1 constructed as described above, as a general rule in the first card processing section 4, magnetic information recorded in the card 2 is only read. Specifically, only reading the magnetic information recorded in the card 2 is carried out as explained below.

Namely, a user inserts the card 2 into the first card processing section 4 through the card insertion slot 3 under a condition where the first to third transfer rollers 25 to 27 are in a halting state. Specifically, as shown in FIG. 5A, the user inserts the card 2 into the first card processing section 4 while grasping the front end side of the card 2, until the rear end of the card 2 reaches the position where the first transfer roller 25 and the first pad roller 28 contact each other. As the insertion of the card 2 progresses, the magnetic head 12 reads the magnetic information recorded in the card 2. The user recognizes that the insertion of the card 2 has finished, by sensing that the rear end of the card 2 gets in touch with the part where the first transfer roller 25 and the first pad roller 28 contact each other (or by sensing that the rear end of the card 2 gets into the gap between the first transfer roller 25 and the first pad roller 28).

As the magnetic head 12 reads the magnetic information, the magnetic information is entered into the record necessity judgment section 46. In most cases according to the present embodiment, the record necessity judgment section 46 judges it unnecessary to record the magnetic information into the card 2 by the magnetic head 22, in accordance with the magnetic information entered. Therefore, as the user pulls out the card 2 inserted under the condition, usually the card processing device 1 finishes its operation.

However, in the card processing device 1, recording magnetic information into the card 2 inserted is carried out as required. Specifically, magnetic information is recorded into the card 2 as described below.

When the record necessity judgment section 46 judges it necessary to record the magnetic information into the card 2 by the magnetic head 22, in accordance with the magnetic information entered, the motor control section 48 drives the drive motor 31 according to a drive command from the control command section 50 under a condition shown in FIG. 5A. Then, as FIG. 5B shows, the first to third transfer rollers 25 to 27 take the card 2, already inserted into the first card processing section 4, into the second card processing section 5. Incidentally, in this case, a prescribed display section of the higher-level device, in which the card processing device 1 is mounted, indicates that the card 2 is taken into the second card processing section 5.

While the first to third transfer rollers 25 to 27 take the card 2 into the second card processing section 5 to have a condition shown in FIG. 5B (in other words, until the front end of the card 2 arrives almost at a middle position in the front-back direction of the second card processing section 5), the head control section 49 supplies the recording current to the magnetic head 22 according to an energization command from the control command section 50 so that the magnetic head 22 records magnetic information into the magnetic stripe 2a of the card 2. Incidentally, the magnetic information recorded by the magnetic head 22 includes, for example, updated information of magnetic information to be read with the magnetic head 12 in the next or later processing by the card processing device 1.

Subsequently, the first to third transfer rollers 25 to 27 transfer the card 2 until the rear end of the card 2 arrives almost at the middle position in the front-back direction of the second card processing section 5, and meanwhile the magnetic head 22 carries out confirmation reading for the purpose of confirming the magnetic information recorded in the card 2. Then, the control command section 50 makes a judgment on a result of the confirmation reading. If the control command section 50 judges that the magnetic information is recorded appropriately, the first to third transfer rollers 25 to 27 send the card 2 out of the second card processing section 5 to the first card processing section 4, as shown in FIG. 5C.

The front end side of the card 2, sent out of the second card processing section 5 to the first card processing section 4, is exposed at the finger insertion part 11a and the cut part 11b. Then, as the user pulls out the card 2 by grasping the front end side of the card 2 exposed, the card processing device 1 finishes its operation in the case where the magnetic information is recorded into the card 2.

If, after the confirmation reading of the magnetic information recorded in the card 2, the control command section 50 judges that the magnetic information is not recorded appropriately; the first to third transfer rollers 25 to 27 transfer again the card 2, which has been transferred until the rear end of the card 2 arrives almost at the middle position in the front-back direction of the second card processing section 5, into a condition shown in FIG. 5B, and meanwhile the magnetic head 22 records the magnetic information into the card 2 again. Then, in the same way as before again, the first to third transfer rollers 25 to 27 transfer the card 2, and the magnetic head 22 carries out confirmation reading for the purpose of confirming the magnetic information recorded in the card 2.

(Primary Advantageous Effect of the Present Embodiment)

As described above, in the present embodiment, the card processing device 1 includes the first card processing section 4 having the card insertion slot 3 and the magnetic head 12, and the second card processing section 5 connected to the rear end of the first card processing section 4. Therefore, the first card processing section 4 alone can carry out reading magnetic information of the card 2 inserted. Therefore, for only reading the magnetic information of the card 2, it is not required to send the card 2 to the second card processing section 5 equipped with the magnetic head 22 that is provided with a recording function. As a result, according to the present embodiment, in the card processing device 1 provided with a reading function for reading magnetic information from the card 2 as well as a recording function for recording magnetic information into the card 2, abrasion to the magnetic head 22 provided with the recording function can be suppressed.

Furthermore, in the card processing device 1 according to the present embodiment, usually the card is not taken into the second card processing section 5, and magnetic information is read in the first card processing section 4 under a condition where the user is grasping the card 2. Therefore, it becomes possible to avoid a so-called card swindle crime such as a phishing scam. Furthermore, it is also possible to suppress a so-called card jam.

In the present embodiment, the second card processing section 5 has the first transfer roller 25 and the first pad roller 28 placed at the boundary of the first card processing section 4 and the second card processing section 5. Therefore, when it is necessary to record information into the card 2, the card 2 can be taken into the second card processing section 5 appropriately by turning the first transfer roller 25 in a forward direction. On the other hand, in a case where only reading the magnetic information of the card 2 by the first card processing section 4 is carried out, the first transfer roller 25 can get stopped so as to prevent the card 2 from entering the second card processing section 5.

In the present embodiment, the magnetic information recorded by the magnetic head 22 includes, for example, updated information of magnetic information to be read with the magnetic head 12 in the next or later processing by the card processing device 1. Therefore, magnetic information to be read in the first card processing section 4 can easily be updated in the second card processing section 5.

In the present embodiment, the distance L1, existing between the turning center of the first transfer roller 25 and the gap position of the magnetic head 12, is longer than the length of the card 2 in its longitudinal direction. Therefore, even when the magnetic stripe 2a is so formed as to extend in a whole range in the front-back direction, the magnetic head 12 can complete operation of reading magnetic information for sure before the rear end of the card 2 inserted through the card insertion slot 3 reaches the first transfer roller 25. Accordingly, the user can insert the card 2 smoothly into the first card processing section 4 so that the first card processing section 4 can appropriately read the magnetic information.

In the present embodiment, operation of sending the card 2 from the second card processing section 5 to the first card processing section 4 by the card transfer mechanism 21 finishes under a condition where the card 2 has got out of the gap between the first transfer roller 25 and the first pad roller 28, and the card 2 is partially exposed out of the card insertion slot 3. Therefore, a pullout resistance, at the time when the user pulls the card 2 out of the first card processing section 4, can be reduced so that the user can easily pull the card out of the first card processing section 4. Furthermore, in the present embodiment, the motor control section 48 decelerates the drive motor 31 to eventually stop it at a predetermined time after the rear detection section 14 detects the front end of the card 2. Therefore, even in a case where operation of sending out the card 2 finishes while the card 2 being out of the gap between the first transfer roller 25 and the first pad roller 28, operation accuracy of stopping the card 2 can be improved.

In the present embodiment, the card processing device 1 includes the record necessity judgment section 46 that makes a judgment on the necessity of recording magnetic information in the second card processing section 5 according to magnetic information entered, wherein the magnetic information read by the magnetic head 12 is entered into the record necessity judgment section 46. Eventually, it can be judged according to the magnetic information read in the first card processing section 4, whether or not the card 2 is taken into the second card processing section 5.

In the present embodiment, the card processing device 1 includes the transmission section 47 for sending the magnetic information, read by the magnetic head 12, to the higher-level device. Therefore the higher-level device can carry out various control operations on the card processing device 1 according to a reading result of the magnetic information read by the magnetic head 12.

As a general rule in the present embodiment, only reading the magnetic information recorded in the card 2 is carried out in the first card processing section 4. Therefore, what wears out easily is the magnetic head 12 that does not have a recording function and costs less expensive relatively, in comparison with the magnetic head 22 that has a recording function and costs relatively expensive. However, in the present embodiment, when either of the first card processing section 4 and the magnetic head 12 is so constructed as to be replaceable, it becomes possible to reduce running costs in comparison with a case of a card reader described above in Patent Documents 1 and 2. Namely, in the case of a card reader described in Patent Document 2 for example, a recording magnetic head wears out even when only reading magnetic information recorded in a card is carried out, so that a replacement frequency of the recording magnetic head becomes high. With respect to the recording magnetic head, replacement of the magnetic head involves difficulties in a position adjustment and a skew adjustment (adjusting a skew of a gap of the magnetic head). Therefore, in reality, an entire section of the card reader is replaced when the recording magnetic head becomes worn out, and the replaced card reader is discarded. Meanwhile, in the present embodiment, as the first card processing section 4 is so constructed as to be replaceable (in other words, each of the first card processing section 4 and the second card processing section 5 is unitized), or the magnetic head 12 is so constructed as to be replaceable, a frequency of replacing and discarding the second card processing section 5, including the magnetic head 22 that is relatively expensive, significantly becomes low so that running costs can be reduced. Since the magnetic head 12 is exclusively used for reading, it is not required to pay so much attention for an adjustment on a track position of the magnetic head 12 (placement location of the magnetic head 12 in a traversing direction) as well as a skew adjustment even in replacement of the magnetic head 12. Therefore, replacing the magnetic head 12 alone can be carried out easily.

(Other Embodiments)

Described above is an example of a preferred embodiment according to the present invention. However, the present invention is not limited to the above embodiment and various variations and modifications may be made without changing the concept of the present invention.

In the embodiment described above, when the card 2 is inserted into the first card processing section 4, the first to third transfer rollers 25 to 27 are in a halting state. In the meantime, when the first card processing section 4 reads magnetic information, the card 2 is inserted until the rear end of the card 2 reaches the part where the first transfer roller 25 and the first pad roller 28 contact each other. In other words, the part where the first transfer roller 25 and the first pad roller 28 contact each other functions as a stopper for preventing the card 2 from entering the second card processing section 5.

For example otherwise, the card processing device 1 may have a shutter, which can appear in a card transfer path as a passage for the card 2 (for example, at a gap between the card transfer path 16 and the card transfer path 24, and the like) at the boundary of the first card processing section 4 and the second card processing section 5. In this case, when only reading the magnetic information of the card 2 is carried out, the shutter can surely prevent the card 2 from entering the second card processing section 5. In this case, the shutter is so constructed as to move in a vertical direction in relation with the card transfer path.

Furthermore, when the card 2 is inserted into the first card processing section 4, the first to third transfer rollers 25 to 27 may turn in such a direction as to send the card 2 toward the front side direction (in a counterclockwise direction in FIG. 3) to prevent the card 2 from entering the second card processing section 5.

In the embodiment described above, the distance L1, existing between the turning center of the first transfer roller 25 and the gap position of the magnetic head 12, is longer than the length of the card 2 in its longitudinal direction. For example otherwise, if the card 2 including magnetic information recorded only in a limited part in the longitudinal direction of the magnetic stripe 2a is inserted into the first card processing section 4, the distance L1 only needs to be longer than the length of the part where the magnetic information is recorded in the magnetic stripe 2a. Specifically, the distance L1 only needs to be longer than a distance from a record start position of the magnetic information at the front end side of the card 2 to the rear end of the card 2. When the distance L1 is constructed as described above, operation of reading the magnetic information by the magnetic head 12 can finish before the rear end of the card 2 arrives at the first transfer roller 25. Furthermore, the card processing device 1 can be downsized in this case.

Still further, the distance L1 may as well be shorter than the distance from the record start position of the magnetic information at the front end side of the card 2 to the rear end of the card 2. In this case, only needed is a predetermined evacuation mechanism for evacuating the first pad roller 28 downward (or a mechanism that generates a biasing force for the first pad roller 28 only when the card 2 is taken into the second card processing section 5) so that the card 2 is smoothly inserted even though the card 2 gets in touch with the part where the first transfer roller 25 and the first pad roller 28 contact each other when a user inserts the card 2.

In the embodiment described above, confirmation reading is carried out by using the magnetic head 22 for making sure of the magnetic information recorded by the magnetic head 22. For example otherwise, being taken into the second card processing section 5 until the condition shown in FIG. 5B is substantialized, the card 2 in which the magnetic information has been recorded may be sent out of the second card processing section 5, as it is, to the first card processing section 4 as shown in FIG. 5C, and then confirmation reading of the magnetic information recorded in the card 2 may be carried out by using the magnetic head 12 while the card 2 is subsequently pulled out by the user. As described above, the distance L1 is longer than the length of the card 2 in its longitudinal direction. Meantime, the operation of sending the card 2 from the second card processing section 5 to the first card processing section 4 finishes at the moment when the card 2 has got out of the gap between the first transfer roller 25 and the first pad roller 28. Therefore, as the user pulls the card 2 out of the card processing device 1 by grasping the front end side of the card 2 after the operation of sending the card 2 from the second card processing section 5 to the first card processing section 4 finishes, the confirmation reading for the purpose of confirming the magnetic information recorded in the card 2 can be carried out for sure by using the magnetic head 12.

In this case, if the confirmation reading of the magnetic information recorded in the card 2 cannot appropriately be carried out by using the magnetic head 12, preferably the higher-level device, in which the card processing device 1 is mounted, should ask the user to insert the card 2 again into the card processing device 1. For example, if the higher-level device is equipped with a display section, preferably the display section should indicate that insertion of the card 2 again is needed. Otherwise, if the higher-level device is equipped with a lamp that can flash, preferably the lamp should flash to notify that insertion of the card 2 again is needed.

In the embodiment described above, the motor control section 48 decelerates and eventually stops the drive motor 31 in such a way that the drive motor 31 stops under the condition where the card 2 has got out of the gap between the first transfer roller 25 and the first pad roller 28. For example otherwise, the motor control section 48 may decelerate and eventually stop the drive motor 31 in such a way that the drive motor 31 stops under a condition where the first transfer roller 25 and the first pad roller 28 sandwich the rear end of the card 2 between them. In other words, operation of sending out the card 2 may finish under a condition where the rear end of the card 2 is held between the first transfer roller 25 and the first pad roller 28. According to this configuration, the card 2 can get stopped accurately by the first transfer roller 25 and the first pad roller 28.

In the embodiment described above, if the record necessity judgment section 46 judges it necessary to record magnetic information into the card 2, the card 2 is taken into the second card processing section 5 by using the first to third transfer rollers 25 to 27 and then the magnetic information is recorded into the card 2. For example otherwise, with a card collecting box connected to a rear end of the second card processing section 5 for collecting the card 2, the card 2 taken into the second card processing section 5 may be collected into the card collecting box, when the control section 6 judges according to the magnetic information read by using the magnetic head 12 that it is necessary to collect (or, discard) the card 2. Furthermore, in place of the second card processing section 5, the card collecting box may be connected to a rear end of the first card processing section 4. Also in this case, the card 2 is collected into the card collecting box when the control section 6 judges that it is necessary to collect the card 2.

In the embodiment described above, the card 2 is provided with the magnetic stripe 2a. For example otherwise, in addition to the magnetic stripe 2a, the card 2 may further include an IC chip fixed onto a surface of the card 2, a built-in communication antenna, and/or a print area for thermoelectric printing of characters. In this case, an IC contact that contacts the IC chip, an antenna for communicating with the antenna built in the card 2, and/or a thermoelectric-printing head for printing characters into the print area are installed in the second card processing section 5 as a recording means for recording information into the card 2. In this case, various kinds of information according to the type of the card 2 can appropriately be recorded in the second card processing section 5. Incidentally, the first card processing section 4 instead may include the IC contact, the antenna, and/or the thermoelectric-printing head.

In the embodiment described above, the card processing device 1 includes the record necessity judgment section 46 for judging the necessity of recording magnetic information in the second card processing section 5 according to magnetic information entered. For example otherwise, the card processing device 1 may not include the record necessity judgment section 46, but the control command section 50 instead may judge the necessity of recording the magnetic information in the second card processing section 5.

In the embodiment described above, the second card processing section 5 has the first transfer roller 25 and the first pad roller 28 placed at the boundary of the first card processing section 4 and the second card processing section 5. For example otherwise, the first card processing section 4 instead may include the first transfer roller and the first pad roller placed at the boundary of the first card processing section 4 and the second card processing section 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card processing device for use with a card having a magnetic stripe in which magnetic information is recorded, the card processing device comprising:
    a first card processing section having a card insertion slot at one end of the first card processing section for inserting the card, and a magnetic head for reading magnetic information recorded in the card; and
    a second card processing section having a card transfer mechanism for transferring the card, and a recorder for recording information into the card, wherein the second card processing section is connected to the other end of the first card processing section;
    wherein either of the first card processing section and the second card processing section includes a transfer roller for transferring the card while contacting the card, and a pad roller biased toward the transfer roller;
    wherein the transfer roller and the pad roller are disposed at a boundary of the first card processing section and the second card processing section; and
    wherein a distance between the transfer roller and the magnetic head of the first card processing section is longer than a length of the magnetic stripe of the card.

2. The card processing device according to claim 1, further comprising:
    a shutter, which can appear in a card transfer path for the card passing, at the boundary of the first card processing section and the second card processing section.

3. The card processing device according to claim 1,
    wherein the recorder comprises at least one of a magnetic head, an IC contact, a thermoelectric-printing head, and an antenna for communicating with another antenna mounted on the card.

4. The card processing device according to claim 1,
    wherein the recorder is a magnetic head, and the information recorded by the recorder includes updated information of the magnetic information to be read by the magnetic head of the first card processing section.

5. The card processing device according to claim 1,
    wherein the card transfer mechanism finishes operation of sending out the card under conditions where the card is partially exposed out of the card insertion slot, and the card has already got out of a gap between the transfer roller and the pad roller, when sending out the card from the second card processing section to the first card processing section.

6. The card processing device according to claim 1, wherein the card transfer mechanism finishes operation of sending out the card under conditions where the card is partially exposed out of the card insertion slot, and an end of the card in a transfer direction of the card is held between the transfer roller and the pad roller, while the end of the card being located at a side of the second card processing section, when sending out the card from the second card processing section to the first card processing section.

7. The card processing device according to claim 5, further comprising:
a drive motor for driving the transfer roller, a detection section located in the proximity of the transfer roller for detecting an end of the card in the transfer direction of the card, and a motor control section for controlling the drive motor; and
the motor control section is structured to decelerate the drive motor to stop it at a predetermined time after the detection section detects an end of the card at a side of the first card processing section in the transfer direction.

8. The card processing device according to claim 1, further comprising:
a transmission section for transmitting magnetic information read by the magnetic head of the first card processing section to a higher-level device in which the card processing device is mounted.

9. The card processing device according to claim 8, wherein the card transfer means finishes operation of sending out the card under conditions where the card is partially exposed out of the card insertion slot, and the card has already got out of a gap between the transfer roller and the pad roller, when sending out the card from the second card processing section to the first card processing section.

10. The card processing device according to claim 9, further comprising:
a drive motor for driving the transfer roller, a detection means located in the proximity of the transfer roller for detecting an end of the card in the transfer direction of the card, and a motor control means for controlling the drive motor; and
the motor control means is structured to decelerate the drive motor to stop it at a predetermined time after the detection means detects an end of the card at a side of the first card processing section in the transfer direction.

11. The card processing device according to claim 8, wherein the card transfer means finishes operation of sending out the card under conditions where the card is partially exposed out of the card insertion slot, and an end of the card in a transfer direction of the card is held between the transfer roller and the pad roller, while the end of the card being located at a side of the second card processing section, when sending out the card from the second card processing section to the first card processing section.

12. A card processing device for use with a card, the card processing device comprising:
a first card processing section having a card insertion slot at one end of the first card processing section for inserting the card, and a magnetic head for reading magnetic information recorded in the card;
a second card processing section having a card transfer mechanism for transferring the card, and a recorder for recording information into the card, wherein the second card processing section is connected to the other end of the first card processing section; and
a record necessity judgment section into which magnetic information read by the magnetic head of the first card processing section is entered, and the record necessity judgment section is structured to make a judgment on the necessity of recording information by the recorder according to the magnetic information entered and is operable to open the shutter and transfer the card to the second card processing section for recording, in response to a positive judgment.

13. A card processing device for use with a card having a magnetic stripe in which magnetic information is recorded, the card processing device comprising:
a first card processing section having a card insertion slot at one end of the first card processing section for inserting the card, and a magnetic head for reading magnetic information recorded in the card; and
a second card processing section having a card transfer means for transferring the card, and a recording means for recording information into the card, wherein the second card processing section is connected to the other end of the first card processing section;
wherein either of the first card processing section and the second card processing section includes a transfer roller for transferring the card while contacting the card, and a pad roller biased toward the transfer roller;
wherein the transfer roller and the pad roller are disposed at a boundary of the first card processing section and the second card processing section; and
wherein a distance between the transfer roller and the magnetic head of the first card processing section is longer than a length of the magnetic stripe of the card.

14. The card processing device according to claim 13, wherein the recording means comprises at least one of a magnetic head, an IC contact, a thermoelectric-printing head, and an antenna for communicating with another antenna mounted on the card.

15. The card processing device according to claim 13, wherein the recording means is a magnetic head, and the information recorded by the recording means includes updated information of the magnetic information to be read by the magnetic head of the first card processing section.

16. The card processing device according to claim 13, further comprising:
a transmitting means for transmitting magnetic information read by the magnetic head of the first card processing section to a higher-level device in which the card processing device is mounted.

17. A card processing device for use with a card, the card processing device comprising:
a first card processing section having a card insertion slot at one end of the first card processing section for inserting the card and a magnetic head for reading magnetic information recorded in the card;
a second card processing section having a card transfer means for transferring the card, and a recording means for recording information into the card, wherein the second card processing section is connected to the other end of the first card processing section; and
a judgment means into which magnetic information read by the magnetic head of the first card processing section is entered, and the judgment means is structured to make a judgment on the necessity of recording information by the recording means according to the magnetic information entered and is operable to open the shutter and transfer the card to the second card processing section for recording, in response to a positive judgment.

* * * * *